(No Model.)
T. A. FAIRBAIRN.
CHECK HOOK.
No. 515,544. Patented Feb. 27, 1894.
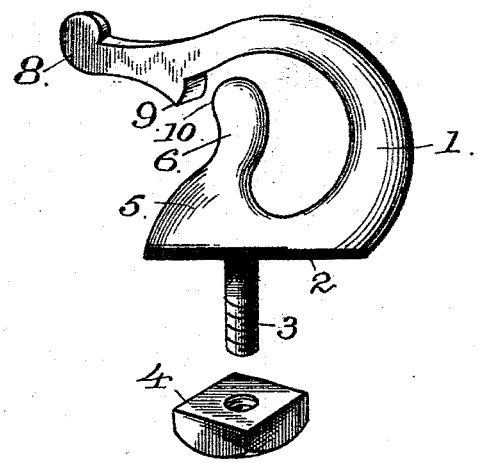
Witnesses
J. W. Reynolds
Chas. B. Hyer
Inventor
Thomas A. Fairbairn
By John Wedderburn
Attorney

UNITED STATES PATENT OFFICE.

THOMAS A. FAIRBAIRN, OF SAN DIEGO, CALIFORNIA.

CHECK-HOOK.

SPECIFICATION forming part of Letters Patent No. 515,544, dated February 27, 1894.

Application filed March 28, 1892. Serial No. 426,737. (No model.)

*To all whom it may concern:*

Be it known that I, THOMAS A. FAIRBAIRN, a citizen of the United States, residing in the city of San Diego, in the county of San Diego and State of California, have invented a new and useful harness-saddle hook for holding and preventing the slipping out of checkreins while driving, of which the following is a specification.

This invention relates to improvements in check hooks, and has for its object to prevent the check rein from sliding out of the hook line while driving.

With this and other objects in view, the invention consists of the construction and arrangement of the several parts which will be more fully hereinafter described and claimed.

The drawing illustrates in perspective the improved check hook.

Referring to the drawing, the numeral 1 designates the hook proper, having a flat base 2, from which depends a shank-hook, 3, adapted to be inserted through a harness saddle or other part of the harness, and secured in place by means of a nut 4. The rear end of the base, 2, is thickened as at 5, and gradually converges into a vertically disposed curved arm, 6. From the said curved arm, the interior contour of the hook sweeps forwardly and upwardly to provide a wall upon the upper terminating end of the said arm, which is a part of a rearwardly projecting guard, 7, which extends in a substantially horizontal direction to a distance behind the said arm 6, and terminates in a round end 8, as is common in devices of this character. The lower edge of the guard 7, in rear of the upper end of the arm 6, is formed with a shoulder 9, having a convex surface, and to provide an easily accessible entrance throat to the check hook. The rear upper portion of the said arm 6, is made concave, as at 10.

In operation, when the check rein is held in the hook and thrown backwardly by a toss or other movement of the horse's head, the rein slides backwardly against and upwardly over the front of the arm 6, until the edge thereof strikes the lower wall of the guard 7, as is directed against the shoulder 9, the distance between the said shoulder 9 and the upper end of the arm 6, being such as to prevent the accidental disarrangement of the rein from the hook at this point and it can only be withdrawn by assistance. Consequently the said rein will be caused to fall back in its proper position in the hook and be thus retained.

Having thus described the invention, what is claimed as new is—

In a check hook, the combination of a hook proper, having an upper horizontally disposed guard with a shoulder on the under edge thereof, and a rear, vertically disposed arm, having an upper reduced end situated adjacent to and in advance of the aforesaid shoulder, and provided with a concave edge at said upper end, said shoulder depending below the upper termination of the said arm, and means for securing said hook in position, substantially as described.

THOS. A. FAIRBAIRN.

Witnesses:
LAURA B. ANDERSON,
A. SEVONT.